US012809919B2

(12) United States Patent
Breen et al.

(10) Patent No.: US 12,809,919 B2
(45) Date of Patent: *Nov. 24, 2026

(54) GLOBAL GRAPH-BASED CLASSIFICATION TECHNIQUES FOR LARGE DATA PREDICTION DOMAIN

(71) Applicant: Optum Services (Ireland) Limited, Dublin (IE)

(72) Inventors: Conor Brian Breen, Dublin (IE); Kashyap Krishnamurthy, Dublin (IE); Peter Cogan, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 19/262,856

(22) Filed: Jul. 8, 2025

(65) Prior Publication Data

US 2026/0154339 A1 Jun. 4, 2026

Related U.S. Application Data

(63) Continuation of application No. 18/498,484, filed on Oct. 31, 2023, now Pat. No. 12,399,937.

(51) Int. Cl.

*G06F 16/00* (2019.01)
*G06F 16/901* (2019.01)
*G06F 40/30* (2020.01)

(52) U.S. Cl.

CPC .......... *G06F 16/9024* (2019.01); *G06F 40/30* (2020.01)

(58) Field of Classification Search

CPC ............................ G06F 16/9024; G06F 40/30

See application file for complete search history.

(56) References Cited

U.S. PATENT DOCUMENTS

| | | | |
|---|---|---|---|
| 10,496,788 B2 | 12/2019 | Amarasingham et al. | |
| 11,593,622 B1 * | 2/2023 | Gandhi | G06N 3/0464 |
| 2016/0110523 A1 | 4/2016 | Francois | |

(Continued)

OTHER PUBLICATIONS

Non-Final Rejection Mailed on Dec. 23, 2025 for U.S. Appl. No. 16/876,364, 18 page(s).

(Continued)

*Primary Examiner* — Alexander Khong

(74) *Attorney, Agent, or Firm* — Alston & Bird LLP

(57) ABSTRACT

Various embodiments of the present disclosure provide data storage, processing, and prediction techniques for providing predictive insights within large data prediction domains. The techniques may include generating, using a plurality of source tables for a prediction domain, a global graph for the prediction domain. The techniques may include generating, using a graph-based machine learning model, a plurality of node-level weights for the plurality of graph nodes based on a plurality of node attributes corresponding to the plurality of graph nodes. The techniques may include generating, using the graph-based machine learning model, a plurality of semantic-level weights for the plurality of weighted edges based on a designated predictive task for the global graph. The techniques may include generating plurality of graph node embeddings and initiating the performance of the designated predictive task based on the plurality of graph node embeddings.

20 Claims, 7 Drawing Sheets

(56) References Cited

U.S. PATENT DOCUMENTS

| | | | | |
|---|---|---|---|---|
| 2017/0185910 | A1* | 6/2017 | Appel | G06F 16/24578 |
| 2019/0156955 | A1 | 5/2019 | Winlo et al. | |
| 2020/0175439 | A1* | 6/2020 | Abu El Ata | G06Q 10/0635 |
| 2020/0305802 | A1 | 10/2020 | Archambault et al. | |
| 2021/0125344 | A1* | 4/2021 | Zhang | G06V 20/10 |
| 2024/0330759 | A1* | 10/2024 | Jordan | G06F 40/30 |
| 2024/0333730 | A1* | 10/2024 | Wang | G06F 16/951 |
| 2024/0386066 | A1* | 11/2024 | Sun | G06F 16/9536 |

OTHER PUBLICATIONS

Advisory Action (PTOL-303) Mailed on Jan. 2, 2024 for U.S. Appl. No. 16/876,364, 3 page(s).

Advisory Action (PTOL-303) Mailed on Oct. 3, 2025 for U.S. Appl. No. 16/876,364, 3 page(s).

Dubrow, J. K., et al., "The rise of cross-national survey data harmonization in the social sciences: emergence of an interdisciplinary methodological field", Quality and Quantity, May 9, 2015 (online), pp. 1449-1467, vol. 50, Springer, US.

Final Rejection Mailed on Jul. 30, 2025 for U.S. Appl. No. 16/876,364, 18 page(s).

Final Rejection Mailed on Oct. 4, 2023 for U.S. Appl. No. 16/876,364, 48 page(s).

Hadi, Mohammed, et al., "Using Machine Learning and Big Data Analytics to Prioritize Outpatients in HetNets," IEEE INFOCOM 2019—IEEE Conference on Computer Communications Workshops, Apr. 29, 2019 to May 2, 2019, pp. 726-731, Paris, France.

Non-Final Rejection Mailed on Jan. 15, 2025 for U.S. Appl. No. 16/876,364, 15 page(s).

Non-Final Rejection Mailed on Mar. 24, 2023 for U.S. Appl. No. 16/876,364, 38 page(s).

Prasser, Fabian, et al., "Data Integration for Future Medicine (DIFUTURE): An Architectural and Methodological Overview", Methods of Information in Medicine, Jul. 2018, pp. e57-e65, vol. 57, No. S 01, Georg Thieme Verlag KG, Germany.

Salman, O.H., et al., "Multi-Sources Data Fusion Framework for Remote Triage Prioritization in Telehealth", Journal of Medical Systems—Systems-Level Quality Improvement, Jul. 22, 2014, 23 pages, vol. 38, No. 103, Springer, U.S.

* cited by examiner

GLOBAL GRAPH-BASED CLASSIFICATION TECHNIQUES FOR LARGE DATA PREDICTION DOMAIN

CROSS REFERENCE TO RELATED APPLICATIONS

This application is a continuation of U.S. application Ser. No. 18/498,484, entitled "GLOBAL GRAPH-BASED CLASSIFICATION TECHNIQUES FOR LARGE DATA PREDICTION DOMAIN," filed Oct. 31, 2023, the contents of which is incorporated herein by reference in its entirety.

BACKGROUND

Various embodiments of the present disclosure address technical challenges related to the predictive classification techniques in large data prediction domains. Traditional predictive classification techniques may employ machine learning classification models that are trained to generate predictive classifications based on historical observations identified from various datasets. However, traditional machine learning classification models are inefficient at capturing historical observations of relevance in large data prediction domains with robust datasets defining diverse relationships and data types. Thus, traditional predictive classification techniques are ill suited for various big data analytics, such as coordination of benefits (COB) analytics in clinical domains in which machine learning classification models may be trained using structured data descriptive of membership information, historical claims data, and/or the like.

The inefficiencies of traditional predictive classification techniques are derived, at least in part, from the traditional storage techniques used to handle big data. For instance, traditional data storage solutions leverage relational databases in which data is stored in tabular formats. Such storage designs require predefined and carefully modeled set of tables in which each table persists a certain entity of information. The design is thus (i) entity-first and not relationship-first and (ii) rigid and not easily extendible or augmented. Both of these characteristics limit the predictive capabilities of models trained to identify historical observations from such data. For example, given the immense complexity of large data prediction domains, such as health insurance data, a tabular storage design is incapable of capturing all available dimensions of entity information. This, in turn, forces design choices that limit which relationships are being persisted. These manual design choices then impact the performance of machine learning models with unknown results.

Traditional machine learning techniques for large data prediction domains leverage supervised classification machine learning models. Such models learn a function of engineered features and the target. However, they are unable to capture complex relationships between entities and entity-level attributes. Moreover, the traditional models are trained on historic data and are then optimized for certain target classes. Thus, performance of the models is limited by the data purity within each target class. This is problematic as certain target classes may be susceptible to pollution by other classes due to volume limitations (e.g., all records in the database cannot be investigated leading to unprocessed data that is considered as the negative class by default, etc.), false negatives, process designs, and/or the like.

Ultimately, some of the above listed limitations lead to the creation of skewed or biased datasets that require performance compromises to be made during model development. This, in turn, limits the performance of analytical processes, thereby falling short of the true potential of the data and machine learning capabilities. Various embodiments of the present disclosure make important contributions to traditional predictive classification techniques by addressing these technical challenges, among others.

BRIEF SUMMARY

Various embodiments of the present disclosure provide graph-based predictive modeling techniques that improve traditional predictive classification techniques in large data prediction domains. To do so, some of the techniques of the present disclosure enable the generation of a global graph (e.g., a network of member information for a COB use case, etc.) that captures diverse relationships expressed across a prediction domain in a relationship-first manner. By doing so, some of the techniques of the present disclosure, may enable the processing of the global graph, using a graph-based machine learning model, to encode holistic graph node embeddings representing dense and diverse relationships and semantic information associated with each graph node within the global graph. As described herein, each graph node may correspond to an entity within the prediction domain such that graph node embeddings may be leveraged to generate predictive classifications for entities within the prediction domain. In this manner, some techniques of the present disclosure may improve the performance, processing efficiency, and training efficiency of traditional machine learning model leverage within a large data prediction domain. This, in turn, may be practically applied to improve various predictive tasks for various prediction domains including, as one example, COB investigations in a clinical domain.

For instance, some of the techniques of the present disclosure may facilitate a confirmation of dual coverage (e.g., data in addition to member COB probability may be made available to the COB investigation team) in a clinical domain. By way of example, the global graph may define relationship first data structures for health insurance data to generate a heterogeneous undirected graph network that may be processed using graph-based machine leaning models to expose the underlying relationships between nodes and allows for node prediction where there are no observed labels (or insufficient labels) exist.

In some embodiments, a computer-implemented method includes generating, by one or more processors and using a plurality of source tables for a prediction domain, a global graph for the prediction domain that comprises a plurality of graph nodes and a plurality of weighted edges between the plurality of graph nodes; generating, by the one or more processors and using a graph-based machine learning model, a plurality of node-level weights for the plurality of graph nodes based on a plurality of node attributes corresponding to the plurality of graph nodes; generating, by the one or more processors and using the graph-based machine learning model, a plurality of semantic-level weights for the plurality of weighted edges based on a designated predictive task for the global graph; generating, by the one or more processors, a plurality of graph node embeddings based on the plurality of node-level weights and the plurality of semantic-level weights; and initiating, by the one or more processors, the performance of the designated predictive task based on the plurality of graph node embeddings.

In some embodiments, a computing system includes memory and one or more processors communicatively coupled to the memory, the one or more processors are configured to generate, using a plurality of source tables for a prediction domain, a global graph for the prediction domain that comprises a plurality of graph nodes and a plurality of weighted edges between the plurality of graph nodes; generate, using a graph-based machine learning model, a plurality of node-level weights for the plurality of graph nodes based on a plurality of node attributes corresponding to the plurality of graph nodes; generate, using the graph-based machine learning model, a plurality of semantic-level weights for the plurality of weighted edges based on a designated predictive task for the global graph; generate a plurality of graph node embeddings based on the plurality of node-level weights and the plurality of semantic-level weights; and initiate the performance of the designated predictive task based on the plurality of graph node embeddings.

In some embodiments, one or more non-transitory computer-readable storage media include instructions that, when executed by one or more processors, cause the one or more processors to: generate, using a plurality of source tables for a prediction domain, a global graph for the prediction domain that comprises a plurality of graph nodes and a plurality of weighted edges between the plurality of graph nodes; generate, using a graph-based machine learning model, a plurality of node-level weights for the plurality of graph nodes based on a plurality of node attributes corresponding to the plurality of graph nodes; generate, using the graph-based machine learning model, a plurality of semantic-level weights for the plurality of weighted edges based on a designated predictive task for the global graph; generate a plurality of graph node embeddings based on the plurality of node-level weights and the plurality of semantic-level weights; and initiate the performance of the designated predictive task based on the plurality of graph node embeddings.

DETAILED DESCRIPTION

Figure 1:
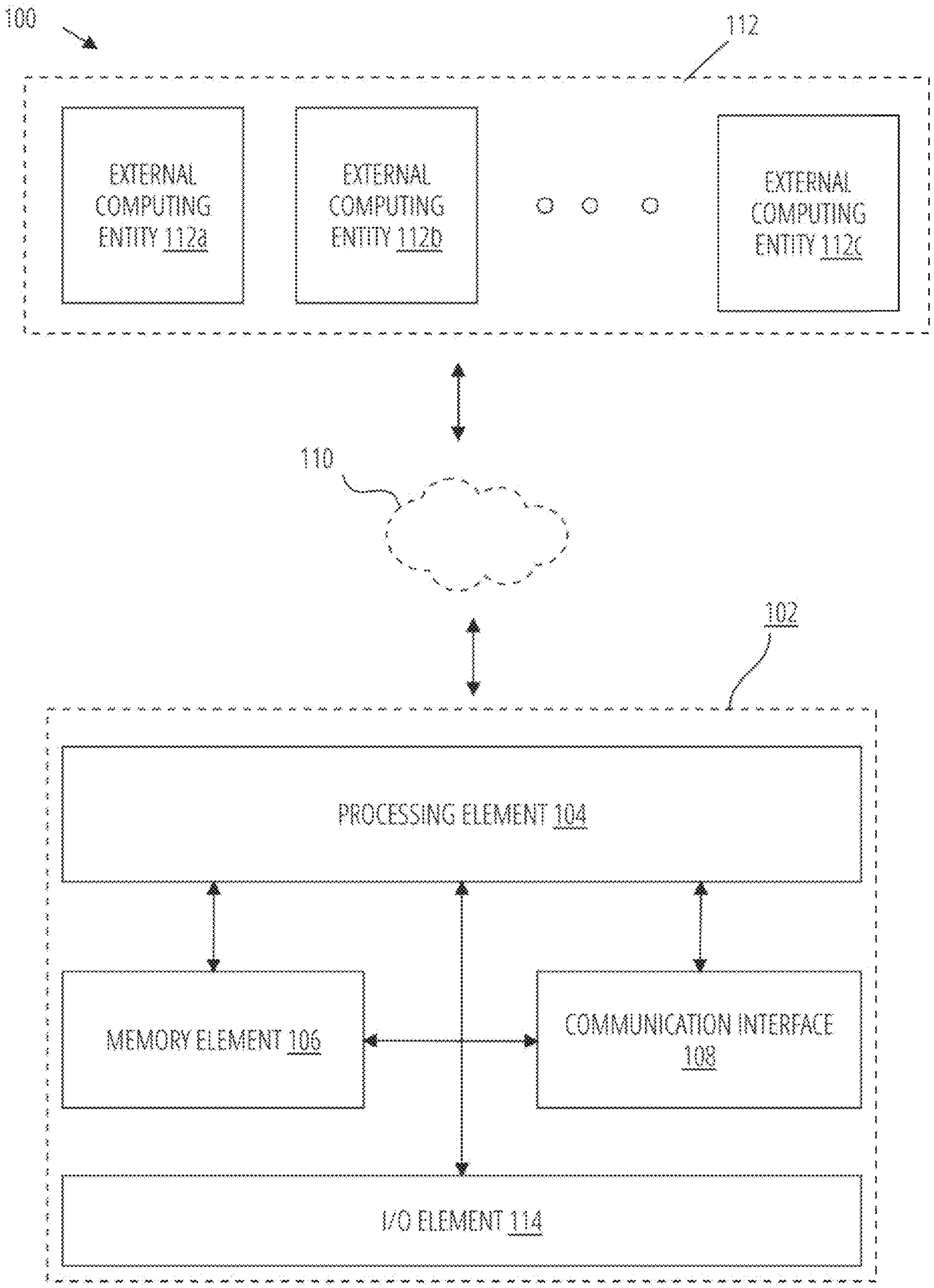
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not indicate being based only on or based solely on the referenced element or elements unless so indicated. Like numbers refer to like elements throughout. Moreover, while certain embodiments of the present disclosure are described with reference to predictive data analysis, one of ordinary skills in the art will recognize that the disclosed concepts may be used to perform other types of data analysis.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like). A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 illustrates an example computing system 100 in accordance with one or more embodiments of the present disclosure. The computing system 100 may include a predictive computing entity 102 and/or one or more external computing entities 112*a-c* communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112*a-c* to perform one or more steps/operations of one or more techniques (e.g., data storage techniques, prediction techniques, classification techniques, and/or the like) described herein.

The external computing entities 112*a-c*, for example, may include and/or be associated with one or more entities that may be configured to receive, store, manage, and/or facilitate datasets, such as the historical dataset, source tables, modification data objects, and/or the like. The external computing entities 112*a-c* may provide such datasets, and/or the like to the predictive computing entity 102 which may leverage the datasets to generate a global graph, one or more predictive classification, and/or the like, as described herein. In some examples, the datasets may include an aggregation of data from across the external computing entities 112*a-c* into one or more aggregated datasets. The external computing entities 112*a-c*, for example, may be associated with one or more data repositories, cloud platforms, compute nodes, organizations, and/or the like, that may be individually and/or collectively leveraged by the predictive computing entity 102 to obtain and aggregate data for a prediction domain.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like, may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112*a-c*, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
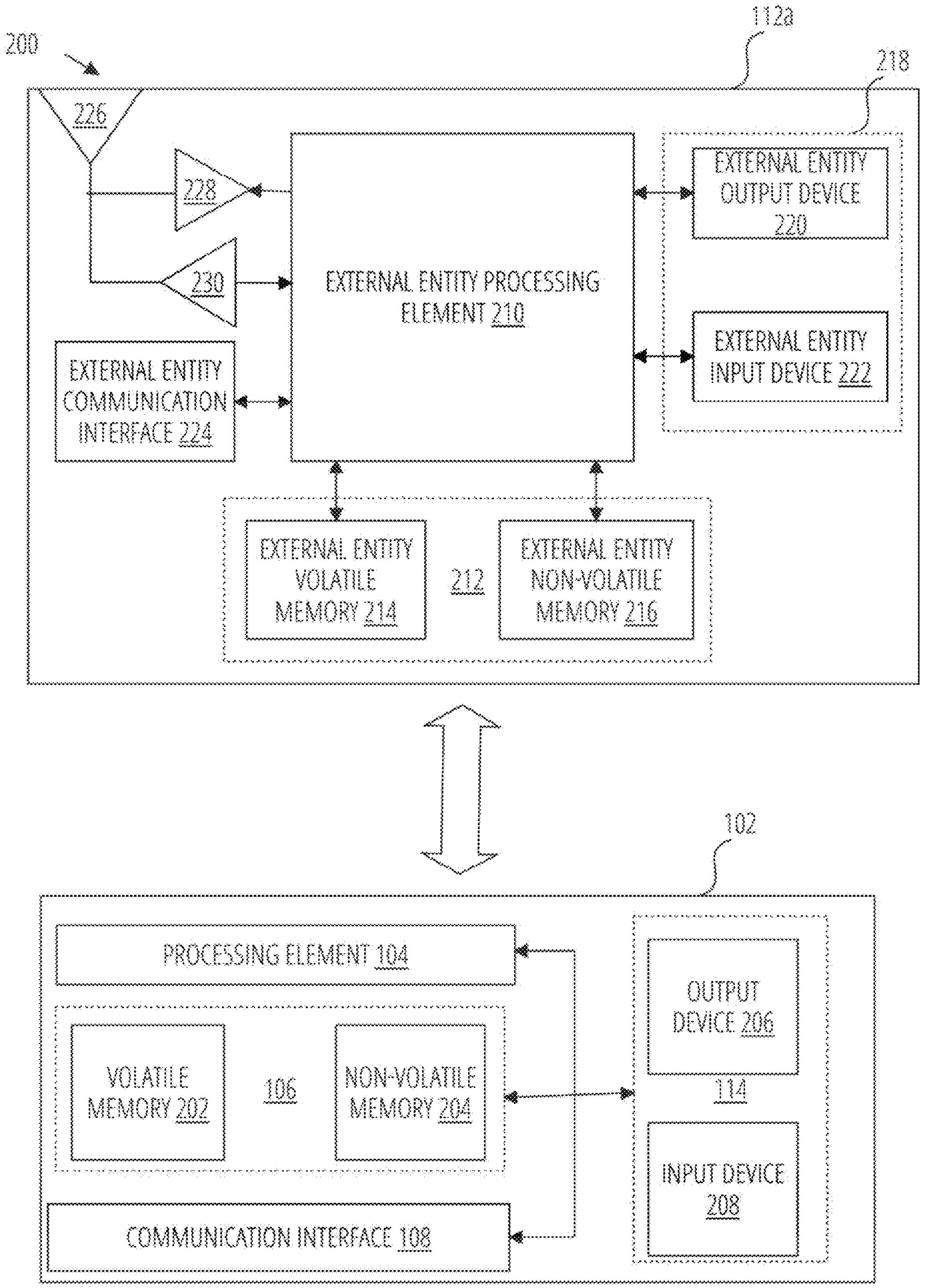
FIG. 2 is a schematic diagram showing a system computing architecture in accordance with one or more embodiments of the present disclosure.

FIG. 2 is a schematic diagram showing a system computing architecture 200 in accordance with some embodiments discussed herein. In some embodiments, the system computing architecture 200 may include the predictive computing entity 102 and/or the external computing entity 112*a* of the computing system 100. The predictive computing entity 102 and/or the external computing entity 112*a* may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more steps/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product which includes non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112*a*. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112*a* may include an external entity processing element 210, an external entity memory element 212, an external entity communication interface 224, and/or one or more external entity I/O elements 218 that communicate within the external computing entity 112*a* via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112*a* may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112*a* may be capable of operating with one or more air interface standards, communication protocols, modulation types, and access types. More particularly, the external computing entity 112*a* may operate in accordance with any of a number of wireless communication standards and protocols, such as those described above with regard to the predictive computing entity 102.

Via these communication standards and protocols, the external computing entity 112*a* may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112*a* may also download changes, add-ons, and updates, for instance, to its firmware, software (e.g., including executable instructions, applications, program modules), operating system, and/or the like.

According to one embodiment, the external computing entity 112*a* may include location determining embodiments, devices, modules, functionalities, and/or the like. For example, the external computing entity 112*a* may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112*a* in connection with a variety of other systems, including cellular towers, Wi-Fi access points, and/or the like. Similarly, the external computing entity 112*a* may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112*a* to interact with and/or cause the display, announcement, and/or the like of information/data to a user. The user input interface may include any of a number of input devices or interfaces allowing the external computing entity 112*a* to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112*a* and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. Examples of Certain Terms

In some embodiments, the term "prediction domain" refers to an area of knowledge that may be augmented by one or more predictions using some of the techniques of the present disclosure. A prediction domain may include any knowledge area and may be associated with data descriptive of one or more known characteristics, attributes, and/or the like within the knowledge area. Examples of prediction domains may include financial domains, clinical domains, logistics domains, and/or the like. Prediction domains may be associated with big data that includes a variety of different data types, at times, arriving in increasing volumes and velocity. For example, a clinical domain may be associated with various clinical datasets each describing attributes for one or more entities (e.g., members, providers, etc.) that operate within the clinical domain. By way of example, a prediction domain may include a coordination of benefits (COB) domain in which healthcare insurers offer, manage, and/or facilitate one or more different coverage plans across a plurality of members.

In some embodiments, diverse sets data associated with a prediction domain may be monitored, received, updated, and/or stored to generate a global knowledge base for the prediction domain. The global knowledge base may include a plurality of disparate data structures each storing one or more portions of data for the prediction domain. The plurality of disparate data structures, for example, may include one or more domain-specific source tables.

In some embodiments, the term "source table" refers to a data structure that describes data associated with a portion of a prediction domain. A source table may include any type of data storage structure including, as examples, one or more linked lists, databases, and/or the like. In some examples, a source table may include a relational database. For instance, data associated with portions of the prediction domain may be persisted in one or more relational databases where it is organized in one or more different data tables. In some examples, the one or more different data tables may be linked by relationships to entities within a prediction domain. As an example, in a clinical domain, the core of the generated data for the clinical domain is member related information and/or associated transactional data that is not limited to a member's health. In such an example, each of the source tables may include a plurality of attributes that are directly and/or indirectly linked to a member within the clinical domain.

A prediction domain may be associated with a plurality of source tables. By way of example, in a clinical domain, a source table may include a member table, a claim table, a client enterprise table, an insurance plan table, and/or the like. Each of the tables may include one or more member attributes and/or attributes that may be linked to a member. For instance, a member table may include member attributes, such as a member identifier, a data of birth, an address, a plan identifier, a family member identifier of another member, a relationship type with respect to the other member, an employer identifier, an employment type, among other attributes. In some examples, a claim table may include claim attributes that are associated with a member, such as a claim identifier, the member identifier corresponding to a member associated with the claim, a timestamp, a cost, a healthcare location (e.g., hospital, etc.), a diagnosis code, amount other attributes. In some examples, a client enterprise table may include enterprise attributes that are associated with a member, such as an employer identifier (e.g., linked to an employer identifier in a member table, etc.), an address, number of employees, insurance plan identifiers, start dates, among other attributes. In some examples, an insurance plan table may include plan attributes that are associated with a member, such as a plan identifier (e.g., linked to a plan identifier in a member table, etc.), a plan name, a cost, a location services, contextual details, among other attributes. In some examples, an investigation table may include investigation attributes that are associated with a member, such as the member identifier, an investigation identifier, an investigation data, an investigation result, among other attributes.

In some examples, a plurality of source tables may be processed using analytic models that may be augmented by machine learning techniques. However, the complex connections between the plurality of source tables reduce the efficiency, reliability, adaptability, and the functionality of such techniques. To address this technical challenge, data from a plurality of source tables for a prediction domain may be aggregated to generate a global graph.

In some embodiments, the term "global graph" refers to a data structure that describes the prediction domain. The data structure, for example, may persist data in a form of items linked by their relationship to one another. The building blocks of the global graph may include nodes and edges where nodes are the vertices and edges are the links that connect the nodes. By way of example, a global graph may include a graph data structure, such as an undirected and acyclic graph with a plurality of nodes and edges. In some examples, the nodes and edges of the global graph may be generated based on data from each of a plurality of source tables for a prediction domain. For instance, source table data (e.g., member attributes, claim attributes, enterprise attributes, plan attributes, investigation attributes, etc. for a clinical domain) may be aggregated to construct the global graph.

In some embodiments, a global graph defines a plurality of graph nodes and weighted edges. Each of the graph nodes, for example, may correspond to an entity within a prediction domain, such as a member in a clinical domain. Each of the weighted edges connect at least two graph nodes and correspond to a relationship between the two graph nodes. In this manner, using a clinical domain as an example, a global graph may capture health insurance data in the form of a heterogenous graph network by generating a plurality of member nodes from attributes sourced from the plurality of source tables. In some examples, in addition to the attributes from the source tables, a global graph may include derived data, such as a member's age (e.g., from a date of birth attribute, etc.), geographic distances (e.g., from between employer and member locations, etc.), and/or open source information, such as a geographic location's population, mean age, cost of living, etc., a company's size, industry, revenue, etc., an insurance plan or coverage type, and/or the like.

In some embodiments, the term "graph node" refers to a component of a global graph that describes an entity within a prediction domain. A graph node, for example, may include a vertex of the global graph that corresponds to an entity within the prediction domain. The entity may depend on the prediction domain. For example, in a clinical domain, the graph node may describe a member within a healthcare domain. The graph node may be associated with a plurality of node attributes that correspond to the entity. The node attributes may be aggregated from a plurality of source tables corresponding to the prediction domain.

In some embodiments, the term "node attribute" refers to data entity that describes a parameter of a graph node. A node attribute, for example, may include a data value from at least one source table associated with the prediction domain. Each graph node may be associated with one or more node attributes. Each of the one or more node attributes may describe a characteristic of an entity represented by a respective graph node. In some examples, the one or more node attributes may depend on the prediction domain. By way of example, in a clinical domain, example node attributes may include an age, a number of people, a claim history, a geolocation, and/or the like.

In some embodiments, the term "weighted edge" refers to a component of a global graph that describes a relationship within a prediction domain. A weighted edge, for example, may connect two graph nodes of the global graph based on a defined relationship within the prediction domain. For example, the graph nodes of the global graph may be connected via various types of relationships that may be expressed using a plurality of weighted edges. In some examples, some of the connections have a higher significance that may be represented by one or more initial edge weights. In some examples, the one or more initial edge weights may be generated based on a relationship weighting ruleset. The relationship weighting ruleset, for example, may include one or more heuristics (e.g., a spouse is more significant than a brother, etc.) that may define a relationship hierarchy based on one or more historical observations for the prediction domain.

In some examples, the defined relationships may depend on the prediction domain. For example, in a clinical domain, a weighted edge may describe one or more healthcare related relationships, such a familial relationship, legal relationships, healthcare provider relationships, and/or the like. A weighted edge may be associated with one or more edge attributes that correspond to a relationship between two entities. The edge attributes may be aggregated from a plurality of source tables corresponding to the prediction domain.

In some embodiments, the term "edge attribute" refers to data entity that describes a parameter of a weighted edge. An edge attribute, for example, may include a data value from at least one source table associated with the prediction domain. Each weighted edge may be associated with one or more edge attributes. Each of the one or more edge attributes may describe a characteristic of a relationship between two or more graph nodes. For example, an edge attribute may include an initial edge weight (e.g., a relationship weight). In some examples, the one or more edge attributes may depend on the prediction domain. By way of example, in a clinical domain, example edge attributes may include a timestamp, a healthcare cost, a distance, and/or the like.

In some embodiments, the term "graph-based machine learning model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A graph-based machine learning model, for example, may include a machine learning model that is trained to generate node-level embeddings for a designated predictive task. A graph-based machine learning model may include one or more of any type of machine learning model including one or more supervised, unsupervised, semi-supervised, and/or reinforcement learning models. In some embodiments, the graph-based machine learning model may include multiple models configured to perform one or more different stages of an embedding process.

In some embodiments, a graph-based machine learning model includes a machine learning model trained, using one or more semi-supervised training techniques, to generate a graph node embedding for one or more graph nodes of the global graph. The graph-based machine learning model, for example, may be trained to leverage one or more meta-paths formed by the global graph to extract diverse semantic information by learning the relevant meta-paths and fusing semantic information to improve predictive accuracy with respect to a designated predictive task. To do so, the graph-based machine learning model may include a graph model, such as a Heterogeneous Graph Attention Network (HAN) that is trained to generate node-level and semantic-level attention weights for the plurality of graph nodes and weighted edges.

For example, the graph-based machine learning model may be trained to generate a plurality of node-level weights for the plurality of graph nodes of the global graph. For instance, the graph-based machine learning model may receive node attributes for a respective node, project the node attributes across all of the nodes into the same space, and generate node-level attention values (e.g., node-level weights, etc.) by learning the attention values between the nodes and their meta-path based neighbors.

In addition, or alternatively, the graph-based machine learning model may be trained to generate a plurality of semantic-level weights for the plurality of weight edges of the global graph. For instance, the graph-based machine learning model may learn attention values (e.g., semantic-level weights) of one or more different meta-paths with respect to a designated predictive task.

In some examples, the graph-based machine learning model may generate a graph node embedding based on the learned attention values (e.g., node-level weights, semantic-level weights, etc.). For instance, the graph-based machine learning model may generate an optimal combination of neighbors and meta-paths in a hierarchical manner (node-level attention to semantic-level attention), which results in the importance of graph nodes and the meta-paths being taken into consideration simultaneously. The node-level weights and the semantic-level weights may be aggregated to generate graph node embedding for the plurality of graph nodes. In some examples, a weighted combination of the graph node embeddings may be optimized using machine learning techniques, such as semi-supervised backpropagation of errors.

In some embodiments, the term "node-level weight" refers to a data value for a graph node that describes a relevance of one or more node attributes. A node-level weight, for example, may include a learned attention value for a graph node that may be based on one or more node attributes of the respective graph node and/or one or more meta-path-based neighbors.

In some embodiments, the term "semantic-level weight" refers to a data value for a weighted edge that describes a relevance to designated predictive task. A semantic-level weight, for example, may include a learned attention value for a weight edge that may be based on one or more edge attributes, node attributes, and/or a designated predictive task. A semantic-level weight, for example, may be based on a comparison to one or more meta-paths and one or more node labels within a global graph.

In some embodiments, the term "graph node embedding" refers to a data structure that describes a graph node. A graph node embedding, for example, may include an encoded vector (and/or any other data representation, etc.) that encodes one or more attributes (e.g., node attributes, edge attributes, etc.) and/or weights (node-level weights, semantic-level weights, etc.) into a data structure representing a graph node. A graph node embedding may be learned by modifying the weights (e.g., generated through attention, etc.) associated with a graph node. By doing so, a graph node embedding may be learned that emphasized characteristics that are more likely to result in a designated predictive task. As described herein, a graph node embedding may include a vector of a plurality of real numbers that may be leveraged by a plurality of different predictive tasks, including unsupervised techniques for clustering of graph nodes, supervised techniques for generate node classifications, and/or the like.

In some embodiments, the term "designated predictive task" refers to a predictive task that leverages a graph node embedding to generate a prediction within a prediction domain. A designated predictive task may include one or more machine learning, rule based, and/or the like processes that may be leveraged to generate a predictive classification. A designated predictive task may depend on the prediction domain. By way of example, in a clinical domain, a designated predictive task may include a classification process for detecting members with overlapping health care coverages, detecting instances of fraud, waste, and/or abuse, and/or the like.

In some embodiments, the term "node label" refers to a node attribute that describes a ground truth value for a designated predictive task. In some examples, a node label may include a node attribute. By way of example, the plurality of graph nodes may include one or more labeled graph nodes and one or more unlabeled graph nodes. In some examples, a designated predictive task may be configured to generate one or more predictive classifications for the one or more unlabeled graph nodes based on the one or more labeled graph nodes. In this respect, a node label may be based on a prediction domain and/or a designated predictive task within the prediction domain. For instance, in a clinical domain, a node label may identify a graph node with overlapping health care coverages (e.g., instances of COB), instances of fraud, waste, and/or abuse, and/or the like.

In some embodiments, the term "machine learning classification model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A machine learning classification model, for example, may include a machine learning model that is trained to perform a designated predictive task to generate a predictive classification for a prediction domain. A machine learning classification model may include one or more of any type of machine learning model including one or more supervised, unsupervised, semi-supervised, and/or reinforcement learning models. In some embodiments, the machine learning classification model may include multiple models configured to perform one or more different stages of a classification process.

In some examples, a machine learning classification model may include a clustering model. For example, a clustering model may include an unsupervised machine learning model configured to generate one or more node clusters from the plurality of graph nodes based on the plurality of graph node embeddings. For example, the clustering model may include one or more hierarchical clustering models, k-means models, mixture models, and/or the like.

In addition, or alternatively, a machine learning classification model may include an embedding-based classification model. An embedding-based classification model, for example, may be trained using a plurality of graph node embeddings (e.g., and label pairs) to generate probability scores for a predictive classification (e.g., insurance coverage through spouse-to-spouse or child-to-parent or some other relationship, etc.). The embedding-based classification model may generate a predictive classification for one or more graph nodes associated with probability score over a threshold.

In some examples, a predictive classification may be generated based on a comparison between a labeled graph node embedding of the plurality of graph node embeddings and an unlabeled graph node embedding of the plurality of graph node embeddings. By way of example, a probability score of a predictive classification (e.g., a COB label, etc.) for an unlabeled graph node may be based on a dot-product between a graph node embedding for the unlabeled graph node and a graph node embedding for a labelled graph node. In the event that the two nodes are in a close vector space, a high probability score may be generated, and, by extension, a predictive classification may be generated.

In some embodiments, the term "predictive classification" refers to a data entity that describes a predicted value for a designated predictive task. A predictive classification may include an unobserved data value for a graph node that is generated by a designated predictive task. In some examples, a predictive classification may be assigned to a graph node to generate an additional node attribute for the global graph. A predictive classification may depend on a prediction domain. For example, in a clinical domain, a predictive classification may include a COB label indicating whether a member has dual insurance coverage.

In some embodiments, the term "modification data object" refers to a data entity that describes modified data for a prediction domain. A modification data object may include one or more additional, modified, and/or removed nodes, edges, and/or node and/or edge attributes. A modification data object, for example, may include data that is recorded and/or observed data after a generation of a global graph. A modification data object, for example, may include an update to one or more of the plurality of source tables of the prediction domain. A modification data object may depend on a prediction domain. For instance, in a clinical domain, a modification data object may describe a new member, a new claim, a new member address, relationship, residence, and/or the like.

In some embodiments, the term "defined time interval" refers to a data entity that describes a unit of time associated with a reception of one or more modification data objects. In some examples, a defined time interval may identify a time period in between one or more versions of a global graph. For instance, a defined time interval may identify an update frequency for a global graph.

IV. Overview

Embodiments of the present disclosure present improved data storage and prediction techniques that leverage global graph data structures and compatible graph-based machine learning models to improve predictive classifications in a large data prediction domain. For example, some techniques of the present disclosure enable the generation a global graph for a prediction domain. The global graph may be processed using a compatible graph-based machine learning model to generate a plurality of attention weights that capture attribute relevance with respect to a designated predictive task. In this manner, a global graph may be attended (and reattended, etc.) to capture sematic information that is tailored to a particular designated predictive task. In this way, the global graph may be leveraged to flexibly reconfigure data in a large data prediction domain for any designated predictive task. Moreover, the global graph may be augmented over time, and then reattended, to accommodate for changes within the prediction domain. This, in turn, enables an improved flexible data storage mechanism (e.g., with respect to traditional storage mechanisms such as those described herein, etc.) that is reconfigurable, modifiable, and capable of representing dense and diverse relationships across a large data prediction domain.

For example, a global graph may include a heterogeneous, undirected graph which captures core data—such as member data, employer data and geolocation in a clinical domain—in the form of nodes. Weighted edges may be added to capture the connection data—such as relationship, proximity, and employment type in a clinical domain. Complex semantic information may be stored in the global graph and reflected by meta-paths (e.g., sequences of paths, etc.) connected with one or more of the weighted edges between an origin node and a destination node. Different meta-paths in the global graph may reflect diverse semantic information that may be relevant to different predictive task. Therefore, certain meta-paths may be more significant than others depending on a designated predictive task. Some examples of this may include, for a clinical domain, (i) family connections are more significant compared to professional ones, (ii) a longer the duration of employment with a particular company, the greater the strength of the connection, (iii) entities with close geographic proximity could carry a higher significance when compared to those with greater geographic distances, and/or the like. Each graph node and weighted edge of the global graph may store large amounts of data from source table defining various relationship within a prediction domain. In this way, all (or a majority of, etc.) dimensions of information aggregated from across a plurality of source tables for a prediction domain, and in some examples additionally derived information (node and edge attributes), may be effectively captured with a relationship-centric approach. This enable the complexities and interconnectedness in the data to be captured which is a significant improvement from existing solutions.

As described herein, the improved data storage mechanism (e.g., the global graph) of the present disclosure may enable improved prediction techniques for various designated predictive tasks within a prediction domain. For instance, once configured (e.g., attended, etc.), a global graph may be leveraged to generate graph node embeddings that capture dense relationship information tailored to a particular designated predict task. These embeddings may be processed using various predictive techniques to generate predictive classifications for entities within a prediction domain. Unlike tradition predictive classification techniques, the embedding may be structured in a data format that allows machine learning models (or other predictive techniques) to efficiently process and train on diverse relationship and sematic information expressed within a predictive domain. This, in turn, improves model performance and training efficiency which, ultimately, results in a reduction of computing resources and processing times, while achieving improved predictive performances.

By way of example, once the data is captured in the form of a global graph, graph nodes (e.g., representing members in a clinical domain, etc.) in the global graph that have a high probability for a predictive classification may be identified using embeddings corresponding to the respective graph nodes. The embeddings, for example, may be generated using a graph-based machine learning model that learns the importance of various meta-paths within the global graph and assigns weights (e.g., semantic-level weights, etc.) reflective of the learned importance. For each graph node, the importance of meta-path based neighbors may be learned, and the graph-based machine learning model may assign addition weights (e.g., node level weights, etc.) reflective of the learned importance. This results in semantic-level and node-level attentions, respectively. The attention values between graph nodes and their meta-path based neighbors may be aggregated to generate semantic-specific node embeddings (e.g., graph node embeddings, etc.). The graph-based machine learning model may identify an optimal combination of neighbors and meta-paths in a hierarchical manner, which enables the learned node embeddings to better capture the complex structure and rich semantic information in the global graph. Using a semi-supervised approach, the graph-based machine learning model may generate an optimal weighted combination of semantic-specific node embeddings that are tailored to a designated predictive task. These embeddings may then be used as features in various models—that are optimized for the designated predictive task. The global graph may not expose such models to data that is not pure and focuses strictly on data that is pure and confirmed. In this way, the global graph and compatible graph-based machine learning model is able to leverage all of the complexities captured/available in a prediction domain, thereby, achieving higher performance when compared to existing solutions.

Examples of technologically advantageous embodiments of the present disclosure include: (i) global graph building techniques for large data prediction domains, (ii) graph-based predictive classification techniques that leverage a global graph data structure to generate holistic predictive classifications, among other aspects of the present disclosure. Other technical improvements and advantages may be realized by one of ordinary skill in the art.

V. Example System Operations

As indicated, various embodiments of the present disclosure make important technical contributions to data storage and predictive modeling technology. In particular, systems and methods are disclosed herein that implement global graphs and compatible graph-based machine learning models configured model large and diverse dataset within a prediction domain. By doing so, dense embeddings may be generated at an entity level that captures relevant relationships across a diverse prediction domain. As described herein, these embeddings may be leveraged to improve various predictive tasks, which may result in improved machine learning training and inference techniques.

Figure 3:
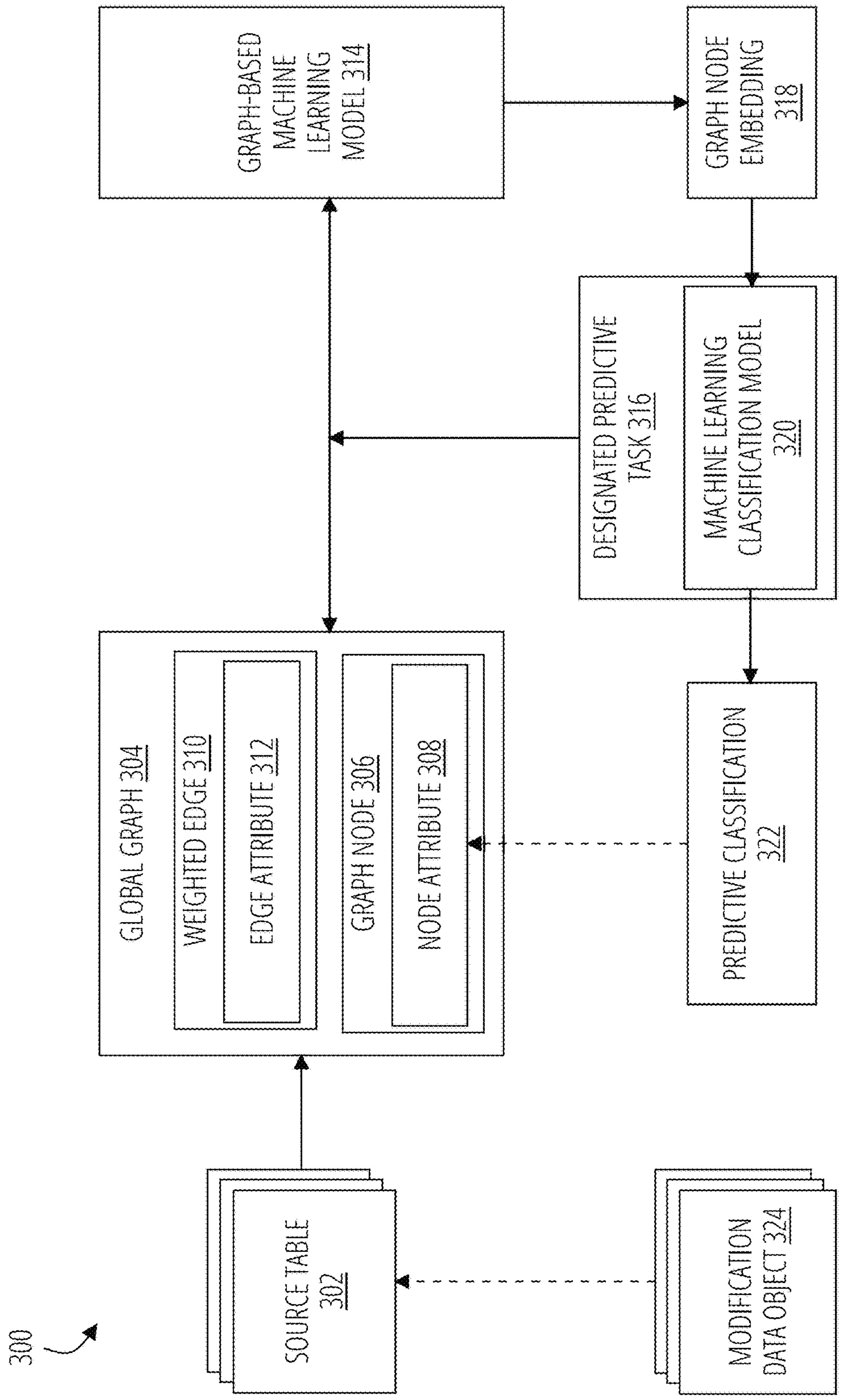
FIG. 3 is a dataflow diagram showing example data structures and modules for generating a predictive classification for an entity within a large data prediction domain in accordance with some embodiments discussed herein.

FIG. 3 is a dataflow diagram 300 showing example data structures and modules for generating a predictive classification for an entity within a large data prediction domain in accordance with some embodiments discussed herein. The dataflow diagram 300, for example, illustrates a plurality of source tables 302 that may be describe diverse sets of data within a prediction domain. Using some of the techniques of the present disclosure, data from the source tables 302 may be leveraged to generate a global graph 304 for the prediction domain. The global graph 304 may be process, using one or more techniques of the present disclosure, to generate predictive classifications 322 for any of various different designated predictive tasks 316. In this way, one global graph 304 may be leveraged to flexibility generate a plurality of different insights for a prediction domain.

In some embodiments, a global graph 304 for the prediction domain is generated using the plurality of source tables 302. The global graph 304 may include a plurality of graph nodes and a plurality of weighted edges between the plurality of graph nodes. In some examples, the global graph 304 includes a heterogeneous and undirected graph data structure. In some examples, each graph node 306 of the plurality of graph nodes may include one or more node attributes 308 of a plurality of node attributes associated with the prediction domain. In some examples, each weighted edge 310 of the plurality of graph nodes may include one or more edge attributes 312 of a plurality of edge attributes associated with the prediction domain. In some embodiments, the global graph is generated, in part, by generating one or more initial weights for the plurality of weighted edges based on a relationship weighting ruleset.

In some embodiments, a prediction domain is an area of knowledge that may be augmented by one or more predictions using some of the techniques of the present disclosure. A prediction domain may include any knowledge area and may be associated with data descriptive of one or more known characteristics, attributes, and/or the like within the knowledge area. Examples of prediction domains may include financial domains, clinical domains, logistics domains, and/or the like. Prediction domains may be associated with big data that includes a variety of different data types, at times, arriving in increasing volumes and velocity. For example, a clinical domain may be associated with various clinical datasets each describing attributes for one or more entities (e.g., members, providers, etc.) that operate within the clinical domain. By way of example, a prediction domain may include a coordination of benefits (COB) domain in which healthcare insurers offer, manage, and/or facilitate one or more different coverage plans across a plurality of members.

In some embodiments, diverse sets data associated with a prediction domain may be monitored, received, updated, and/or stored to generate a global knowledge base for the prediction domain. The global knowledge base may include a plurality of disparate data structures each storing one or more portions of data for the prediction domain. The plurality of disparate data structures, for example, may include one or more domain-specific source tables 302.

In some embodiments, a source table 302 is a data structure that describes data associated with a portion of a prediction domain. The source tables 302 may include any type of data storage structure including, as examples, one or more linked lists, databases, and/or the like. In some examples, the source tables 302 may include relational databases. For instance, data associated with portions of the prediction domain may be persisted in one or more relational databases where it is organized in one or more different data tables. In some examples, the one or more different data tables may be linked by relationships to entities within a prediction domain. As an example, in a clinical domain, the core of the generated data for the clinical domain is member related information and/or associated transactional data that is not limited to a member's health. In such an example, each of the source tables 302 may include a plurality of attributes that are directly and/or indirectly linked to a member within the clinical domain.

A prediction domain may be associated with a plurality of source tables 302. By way of example, in a clinical domain, a source table 302 may include a member table, a claim table, a client enterprise table, an insurance plan table, and/or the like. Each of the tables may include one or more member attributes and/or attributes that may be linked to a member or other entity within the prediction domain. For instance, a member table may include member attributes, such as a member identifier, a data of birth, an address, a plan identifier, a family member identifier of another member, a relationship type with respect to the other member, an employer identifier, an employment type, among other attributes. In some examples, a claim table may include claim attributes that are associated with a member, such as a claim identifier, the member identifier corresponding to a member associated with the claim, a timestamp, a cost, a healthcare location (e.g., hospital, etc.), a diagnosis code, amount other attributes. In some examples, a client enterprise table may include enterprise attributes that are associated with a member, such as an employer identifier (e.g., linked to an employer identifier in a member table, etc.), an address, number of employees, insurance plan identifiers, start dates, among other attributes. In some examples, an insurance plan table may include plan attributes that are associated with a member, such as a plan identifier (e.g., linked to a plan identifier in a member table, etc.), a plan name, a cost, a location services, contextual details, among other attributes. In some examples, an investigation table may include investigation attributes that are associated with a member, such as the member identifier, an investigation identifier, an investigation data, an investigation result, among other attributes.

In some examples, a plurality of source tables 302 may be processed using analytic models that may be augmented by machine learning techniques. However, the complex connections between the plurality of source tables 302 reduce the efficiency, reliability, adaptability, and the functionality of such techniques. To address this technical challenge, data from a plurality of source tables 302 for a prediction domain may be aggregated to generate the global graph 304.

In some embodiments, the global graph 304 is a data structure that describes the prediction domain. The data structure, for example, may persist data in a form of items linked by their relationship to one another. The building blocks of the global graph 304 may include nodes and edges where nodes are the vertices and edges are the links that connect the nodes. By way of example, the global graph 304 may include a graph data structure, such as an undirected and/or acyclic graph with a plurality of nodes and edges. In some examples, the nodes and edges of the global graph 304 may be generated based on data from each of a plurality of source tables 302 for a prediction domain. For instance, source table data (e.g., member attributes, claim attributes, enterprise attributes, plan attributes, investigation attributes, etc. for a clinical domain) may be aggregated to construct the global graph 304.

In some embodiments, the global graph 304 defines a plurality of graph nodes 306 and weighted edges 310. Each of the graph nodes 306, for example, may correspond to an entity within a prediction domain, such as a member, healthcare provider, employer, etc. in a clinical domain. Each of the weighted edges 310 connect at least two graph nodes 306 and correspond to a relationship between the two graph nodes 306. In this manner, using a clinical domain as an example, the global graph 304 may capture health insurance data in the form of a heterogenous graph network by generating a plurality of member nodes from attributes sourced from the plurality of source tables 302. In some examples, in addition to the attributes from the source tables 302, the global graph 304 may include derived data, such as a member's age (e.g., from a date of birth attribute, etc.), geographic distances (e.g., from between employer and member locations, etc.), and/or open source information, such as a geographic location's population, mean age, cost of living, etc., a company's size, industry, revenue, etc., an insurance plan or coverage type, and/or the like.

In some embodiments, a graph node 306 is a component of the global graph 304 that describes an entity within a prediction domain. The graph node 306, for example, may include a vertex of the global graph 304 that corresponds to an entity within the prediction domain. The entity may depend on the prediction domain. For example, in a clinical domain, the graph node 306 may describe a member within a healthcare domain. The graph node 306 may be associated with a plurality of node attributes that correspond to the entity. The node attributes may be aggregated from a plurality of source tables 302 corresponding to the prediction domain.

In some embodiments, a node attribute 308 is a data entity that describes a parameter of a graph node 306. The node attribute 308, for example, may include a data value from at least one source table 302 associated with the prediction domain. Each graph node 306 may be associated with one or more node attributes 308. Each of the one or more node attributes 308 may describe a characteristic of an entity represented by a respective graph node 306. In some examples, the one or more node attributes 308 may depend on the prediction domain. By way of example, in a clinical domain, example node attributes may include an age, a number of people, a claim history, a geolocation, and/or the like.

In some embodiments, a weighted edge 310 is a component of the global graph 304 that describes a relationship within the prediction domain. The weighted edge 310, for example, may connect two graph nodes 306 of the global graph 304 based on a defined relationship within the prediction domain. For example, the graph nodes 306 of the global graph 304 may be connected via various types of relationships that may be expressed using a plurality of weighted edges 310. In some examples, some of the connections have a higher significance that may be represented by one or more initial edge weights. In some examples, the one or more initial edge weights may be generated based on a relationship weighting ruleset. The relationship weighting ruleset, for example, may include one or more heuristics (e.g., a spouse is more significant than a brother, etc.) that may define a relationship hierarchy based on one or more historical observations for the prediction domain. The one or more heuristics, for example, may define a relative significance for each of a plurality of types of weighted edges and/or edge attribute combinations.

In some examples, the defined relationships may depend on the prediction domain. For example, in a clinical domain, a weighted edge 310 may describe one or more healthcare related relationships, such a familial relationship, legal relationships, healthcare provider relationships, and/or the like. The weighted edge 310 may be associated with one or more edge attributes 312 that correspond to a relationship between two entities. The edge attributes 312 may be aggregated from the plurality of source tables 302 corresponding to the prediction domain.

In some embodiments, the edge attribute 312 is a data entity that describes a parameter of a weighted edge 310. An edge attribute 312, for example, may include a data value from at least one source table 302 associated with the prediction domain. Each weighted edge 310 may be associated with one or more edge attributes 312. Each of the one or more edge attributes 312 may describe a characteristic of a relationship between two or more graph nodes 306. For example, an edge attribute 312 may include an initial edge weight (e.g., a relationship weight). In some examples, the one or more edge attributes 312 may depend on the prediction domain. By way of example, in a clinical domain, example edge attributes 312 may include a timestamp, a healthcare cost, a distance, and/or the like.

In some embodiments, a plurality of node-level weights for the plurality of graph nodes are generated based on a plurality of node attributes corresponding to the plurality of graph nodes. The plurality of node-level weights may be generated using a graph-based machine learning model 314. In some examples, a node-level weight of the plurality of node-level weights may be generated for the graph node 306 based on the one or more node attributes 308.

In some embodiments, the graph-based machine learning model 314 is a data entity that describes parameters, hyper-parameters, and/or defined operations of a rules-based and/or machine learning model (e.g., model including at least one of one or more rule-based layers, one or more layers that depend on trained parameters, coefficients, and/or the like). The graph-based machine learning model 314, for example, may include a machine learning model that is trained to generate graph node embeddings 318 for a designated predictive task 316. The graph-based machine learning model 314 may include one or more of any type of machine learning model including one or more supervised, unsupervised, semi-supervised, and/or reinforcement learning models. In some embodiments, the graph-based machine learning model 314 may include multiple models configured to perform one or more different stages of an embedding process.

In some embodiments, a graph-based machine learning model 314 includes a machine learning model trained, using one or more semi-supervised training techniques, to generate a graph node embedding 318 for one or more graph nodes 306 of the global graph 304. The graph-based machine learning model 314, for example, may be trained to leverage one or more meta-paths formed by the global graph 304 to extract diverse semantic information by learning the relevant meta-paths and fusing semantic information to improve predictive accuracy with respect to a designated predictive task 316. To do so, the graph-based machine learning model 314 may include a graph model, such as a Heterogeneous Graph Attention Network (HAN) that is trained to generate node-level and semantic-level attention weights for the plurality of graph nodes 306 and weighted edges 310.

For example, the graph-based machine learning model 314 may be trained to generate a plurality of node-level weights for the plurality of graph nodes 306 of the global graph 304. For instance, the graph-based machine learning model 314 may receive node attributes for a respective node, project the node attributes across all of the nodes into the same space, and generate node-level attention values (e.g., node-level weights, etc.) by learning the attention values between the nodes and their meta-path based neighbors.

In addition, or alternatively, the graph-based machine learning model 314 may be trained to generate a plurality of semantic-level weights 512 for the plurality of weight edges of the global graph 304. For instance, the graph-based machine learning model 314 may learn attention values (e.g., semantic-level weights) of one or more different meta-paths with respect to a designated predictive task 316.

In some examples, the graph-based machine learning model 314 may generate the graph node embedding 318 based on the learned attention values (e.g., node-level weights, semantic-level weights, etc.). For instance, the graph-based machine learning model 314 may generate an optimal combination of neighbors and meta-paths in a hierarchical manner (node-level attention to semantic-level attention), which results in the importance of graph nodes 306 and the meta-paths being taken into consideration simultaneously. The node-level weights and/or the semantic-level weights may be aggregated to generate graph node embeddings 318 for the plurality of graph nodes 306. In some examples, a weighted combination of the graph node embeddings 318 may be optimized using machine learning techniques, such as semi-supervised backpropagation of errors.

In some embodiments, the node-level weight is a data value for a graph node 306 that describes a relevance of one or more node attributes. The node-level weight, for example, may include a learned attention value for the graph node 306 that may be based on one or more node attributes of the respective graph node and/or one or more meta-path-based neighbors.

In some embodiments, a plurality of semantic-level weights for the plurality of weighted edges are generated based on a designated predictive task 316 for the global graph 304. The plurality of semantic-level weights, for example, may be generated using the graph-based machine learning model 314. In some examples, the plurality of node attributes may include one or more node labels for the designated predictive task 316.

In some embodiments, a semantic-level weight is a data value for a weighted edge 310 that describes a relevance to designated predictive task 316. A semantic-level weight, for example, may include a learned attention value for a weight edge that may be based on one or more edge attributes 312, node attributes 308, and/or a designated predictive task 316. A semantic-level weight, for example, may be based on a comparison to one or more meta-paths and/or one or more node labels within the global graph 304.

In some embodiments, the designated predictive task 316 is a predictive task that leverages a graph node embedding 318 to generate a prediction within the prediction domain. The designated predictive task 316 may include one or more machine learning, rule based, and/or the like processes that may be leveraged to generate a predictive classification 322. The designated predictive task 316 may depend on the prediction domain. By way of example, in a clinical domain, the designated predictive task 316 may include a classification process for detecting members with overlapping health care coverages, detecting instances of fraud, waste, and/or abuse, and/or the like.

In some embodiments, a node label is a node attribute that describes a ground truth value for the designated predictive task 316. In some examples, the node label may include a node attribute. By way of example, the plurality of graph nodes 306 may include one or more labeled graph nodes and one or more unlabeled graph nodes. In some examples, the designated predictive task 316 may be configured to generate one or more predictive classifications for the one or more unlabeled graph nodes based on the one or more labeled graph nodes. In this respect, a node label may be based on a prediction domain and/or the designated predictive task 316 within the prediction domain. For instance, in a clinical domain, a node label may identify a graph node 306 with overlapping health care coverages (e.g., instances of COB), instances of fraud, waste, and/or abuse, and/or the like.

In some embodiments, a plurality of graph node embeddings 318 are generated based on the plurality of node-level weights and/or the plurality of semantic-level weights. In some examples, during a training stage, the graph-based machine learning model 314 may be trained to optimize the graph node embeddings 318 for a designated predictive task 316. For instance, a model loss may be generated, using a semi-supervised loss function, for the graph-based machine learning model 314 based on the plurality of graph node embeddings 318. The graph-based machine learning model 314 may be trained to optimize the model loss. For example, one or more of the plurality of node-level weights and/or the plurality of semantic-level weights may be updated based on the model loss.

In some embodiments, the graph node embedding 318 is a data structure that describes a graph node 306. The graph node embedding 318, for example, may include an encoded vector (and/or any other data representation, etc.) that encodes one or more attributes (e.g., node attributes 308, edge attributes 312, etc.) and/or weights (node-level weights, semantic-level weights, etc.) into a data structure representing the graph node 306. The graph node embedding 318 may be learned by modifying the weights (e.g., generated through attention, etc.) associated with the graph node 306. By doing so, the graph node embedding 318 may be learned that emphasized characteristics that are more or less likely to result in a predictive classification 322 of the designated predictive task 316. As described herein, the graph node embedding 318 may include a vector of a plurality of real numbers that may be leveraged by a plurality of different predictive tasks, including unsupervised techniques for clustering of graph nodes 306, supervised techniques for generate node classifications, and/or the like.

In some embodiments, the performance of the designated predictive task 316 is initiated based on the plurality of graph node embeddings 318. In some examples, the designated predictive task 316 may be a machine learning classification task. For instance, initiating the performance of the designated predictive task 316 based on the plurality of graph node embeddings 318 may include generating, using a machine learning classification model 320, one or more predictive classifications 322 for one or more unlabeled graph nodes of the plurality of graph nodes. In some examples, the graph node 306 may be modified by assigning a corresponding predictive classification 322 of one or more predictive classifications to the graph node 306. In this manner, the global graph 304 may be augmented by predictions overtime.

In some examples, the machine learning classification model 320 may include a clustering model configured to generate one or more node clusters from the plurality of graph nodes based on the plurality of graph node embeddings 318. For example, the one or more predictive classifications 322 may be based on the one or more node clusters. In addition, or alternatively, the machine learning classification model 320 may include an embedding-based classification model configured to generate the one or more predictive classifications 322 based on a comparison between a labeled graph node embedding of the plurality of graph node embeddings 318 and an unlabeled graph node embedding of the plurality of graph node embeddings 318. A labeled graph node embedding, for example, may correspond to a labeled graph node of the plurality of graph nodes and the unlabeled graph node embedding may correspond to an unlabeled graph node of the one or more unlabeled graph nodes.

In some embodiments, the machine learning classification model 320 is a data entity that describes parameters, hyper-parameters, and/or defined operations of a rules-based and/or machine learning model (e.g., model including at least one of one or more rule-based layers, one or more layers that depend on trained parameters, coefficients, and/or the like). The machine learning classification model 320, for example, may include a machine learning model that is trained to perform a designated predictive task 316 to generate a predictive classification 322 for a prediction domain. The machine learning classification model 320 may include one or more of any type of machine learning model including one or more supervised, unsupervised, semi-supervised, and/or reinforcement learning models. In some embodiments, the machine learning classification model 320 may include multiple models configured to perform one or more different stages of a classification process.

In some examples, the machine learning classification model 320 may include a clustering model. For example, a clustering model may include an unsupervised machine learning model configured to generate one or more node clusters from the plurality of graph nodes 306 based on the plurality of graph node embeddings 318. For example, the clustering model may include one or more hierarchical clustering models, k-means models, mixture models, and/or the like.

In addition, or alternatively, the machine learning classification model 320 may include an embedding-based classification model. An embedding-based classification model, for example, may be trained using a plurality of graph node embeddings 318 (e.g., and label pairs) to generate probability scores for a predictive classification (e.g., insurance coverage through spouse-to-spouse or child-to-parent or some other relationship, etc.). The embedding-based classification model may generate a predictive classification 322 for one or more graph nodes 306 associated with probability score over a threshold.

In some examples, a predictive classification 322 may be generated based on a comparison between a labeled graph node embedding of the plurality of graph node embeddings 318 and an unlabeled graph node embedding of the plurality of graph node embeddings 318. By way of example, a probability score of a predictive classification 322 (e.g., a COB label, etc.) for an unlabeled graph node may be based on a dot-product between a graph node embedding for the unlabeled graph node and a graph node embedding for a labelled graph node. In the event that the two nodes are in a close vector space, a high probability score may be generated, and, by extension, a predictive classification 322 may be generated.

In some embodiments, the predictive classification 322 is a data entity that describes a predicted value for the designated predictive task 316. The predictive classification 322 may include an unobserved data value for a graph node 306 that is generated by a designated predictive task 316. In some examples, the predictive classification 322 may be assigned to a graph node 306 to generate an additional node attribute for the global graph 304. A predictive classification 322 may depend on a prediction domain. For example, in a clinical domain, a predictive classification 322 may include a COB label indicating whether a member has dual insurance coverage.

In some embodiments, one or more modification data objects 324 are received that are associated with one or more of the plurality of source tables 302. In some examples, in response to the one or more modification data objects 324, the global graph 304 may be regenerated for the prediction domain. In some examples, the one or more modification data objects 324 may be received at a defined time interval.

In some embodiments, the modification data object 324 is a data entity that describes modified data for a prediction domain. A modification data object 324 may include one or more additional, modified, and/or removed nodes, edges, and/or node and/or edge attributes. A modification data object 324, for example, may include data that is recorded and/or observed data after a generation of a global graph 304. A modification data object 324, for example, may include an update to one or more of the plurality of source tables 302 of the prediction domain. A modification data object 324 may depend on a prediction domain. For instance, in a clinical domain, a modification data object 324 may describe a new member, a new claim, a new member address, relationship, residence, and/or the like.

In some embodiments, the defined time interval refers to a data entity that describes a unit of time associated with a reception of one or more modification data objects 324. In some examples, a defined time interval may identify a time period in between one or more versions of a global graph 304. For instance, a defined time interval may identify an update frequency for a global graph 304.

In this manner, using some of the techniques of the present disclosure, one or more predictive insights, such as graph node embeddings 318 and/or predictive classifications 322 derived thereof may be generated based on holistic, up-to-date data. By leveraging the global graph 304, some of the techniques of the present disclosure, provide improved data structures that increase the flexibility and adaptability of data stored in a large data predictive domain. An example of global graph 304 will now further be described with reference to FIGS. 4A-B.

Figure 4A:
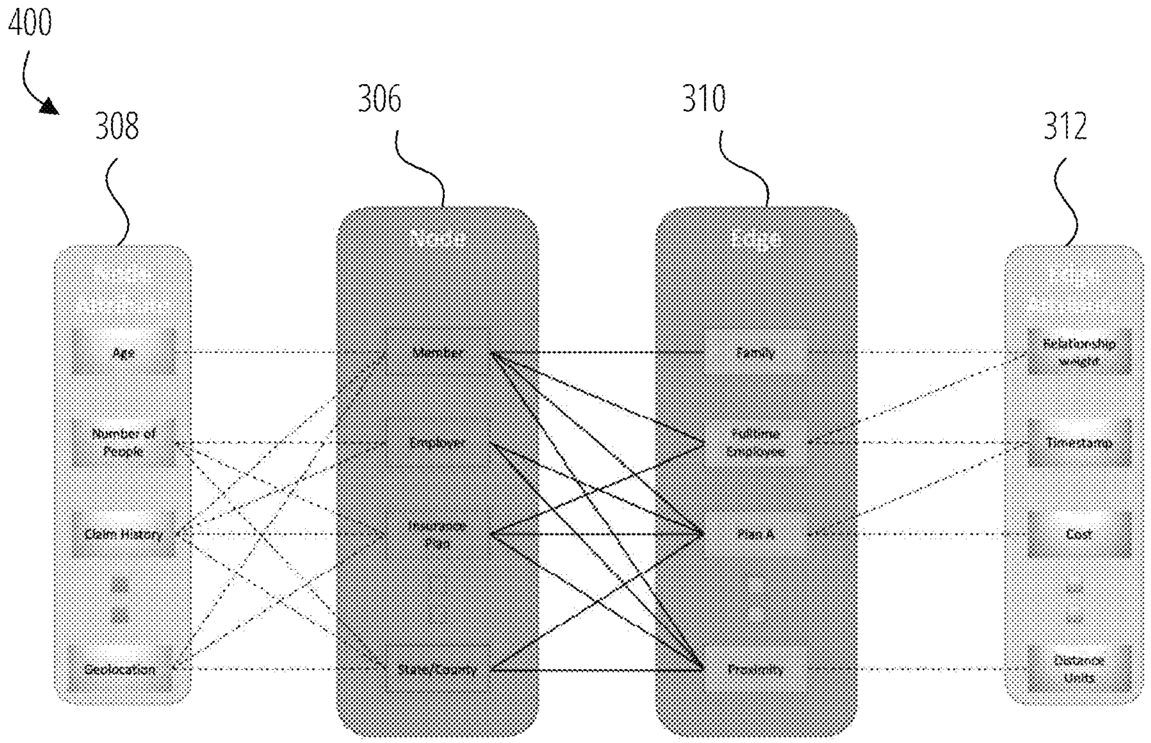
FIGS. 4A-B are example diagrams of a global graph for a prediction domain in accordance with some embodiments discussed herein.
Figure 4B:
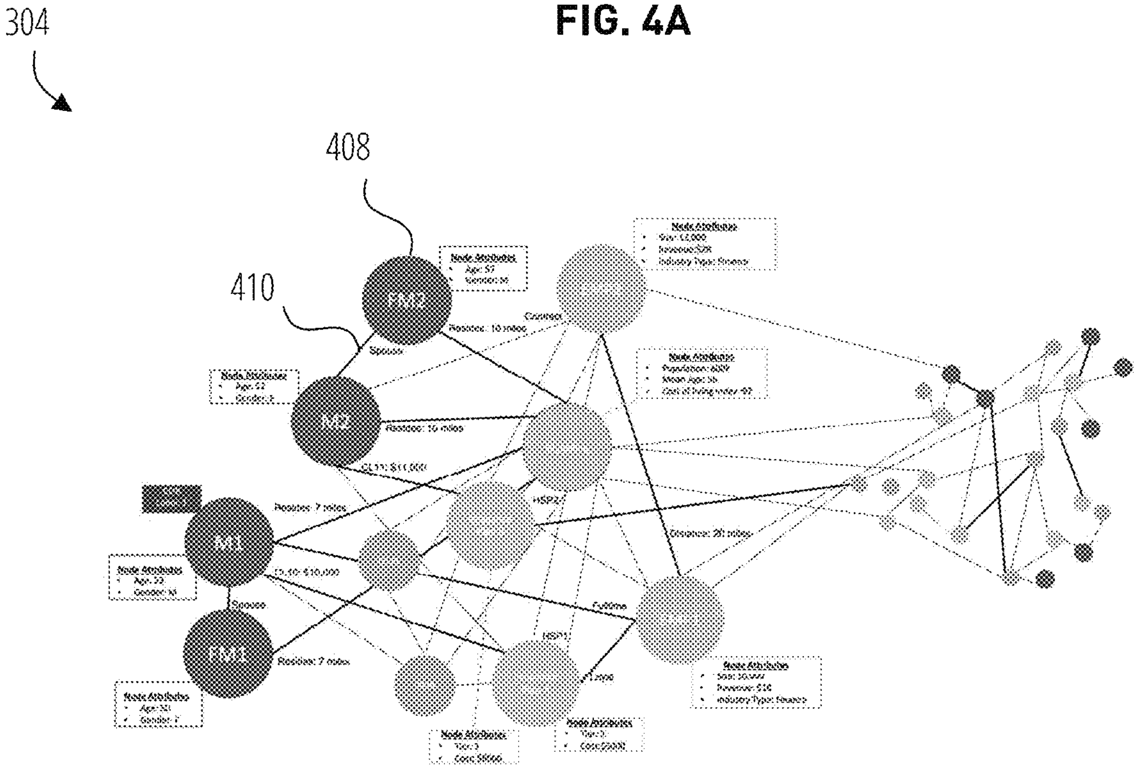

FIGS. 4A-B are example diagrams of a global graph 304 for a prediction domain in accordance with some embodiments discussed herein.

FIG. 4A, for example, depicts an example node-edge pair 400 for the global graph 304. The node-edge pair 400 may include a graph node 306. The graph node 306 may be one of a plurality of node types. The node types, for example, may be based on a prediction domain (e.g., one or more entities within a prediction domain). For instance, in a clinical domain, a node type may include a member, an employer, an insurance plan, a geographic location, and/or the like. Each graph node 306 may be associated with one or more node attributes 308. In some examples, the node attributes 308 may be based on a node type. For example, a member node may include an age attribute, a claim history attribute, a geolocation attribute, and/or the like. As another example, an employer node may include a number of people attribute, a claim history attribute, and/or the like.

The node-edge pair 400 may include a weighted edge 310. The weighted edge 310 may be one of a plurality of edge types. The edge types, for example, may be based on a prediction domain (e.g., one or more relationships within a prediction domain). For instance, in a clinical domain, an edge type may include a family, an employee affiliation (e.g., fulltime, part-time, etc.), a plan affiliation (e.g., primary, etc.), a proximity, and/or the like. Each weighted edge 310 may be associated with one or more edge attributes 312. In some examples, the edge attributes 312 may be based on an edge type. For example, a family edge may include a relationship weight, and/or the like. An employee affiliation may include a relationship weight, a timestamp, and/or the like.

In some embodiments, a plurality of node-edge pairs 400 are organized into a graph data structure 450 to generate the global graph 304, as shown my FIG. 4B. The graph data structure 450 may be augmented, using a graph-based machine learning model, to generate a plurality of node-level and semantic-level weights for each of the plurality of graph nodes 408 and/or weighted edges 410 of the global graph 304. As described herein, these values may be learned with respect to a designated predictive task to enable the generation of graph node embeddings that are predictive of a particular predictive classification. An example embedding process will now further be described with reference to FIG. 5.

Figure 5:
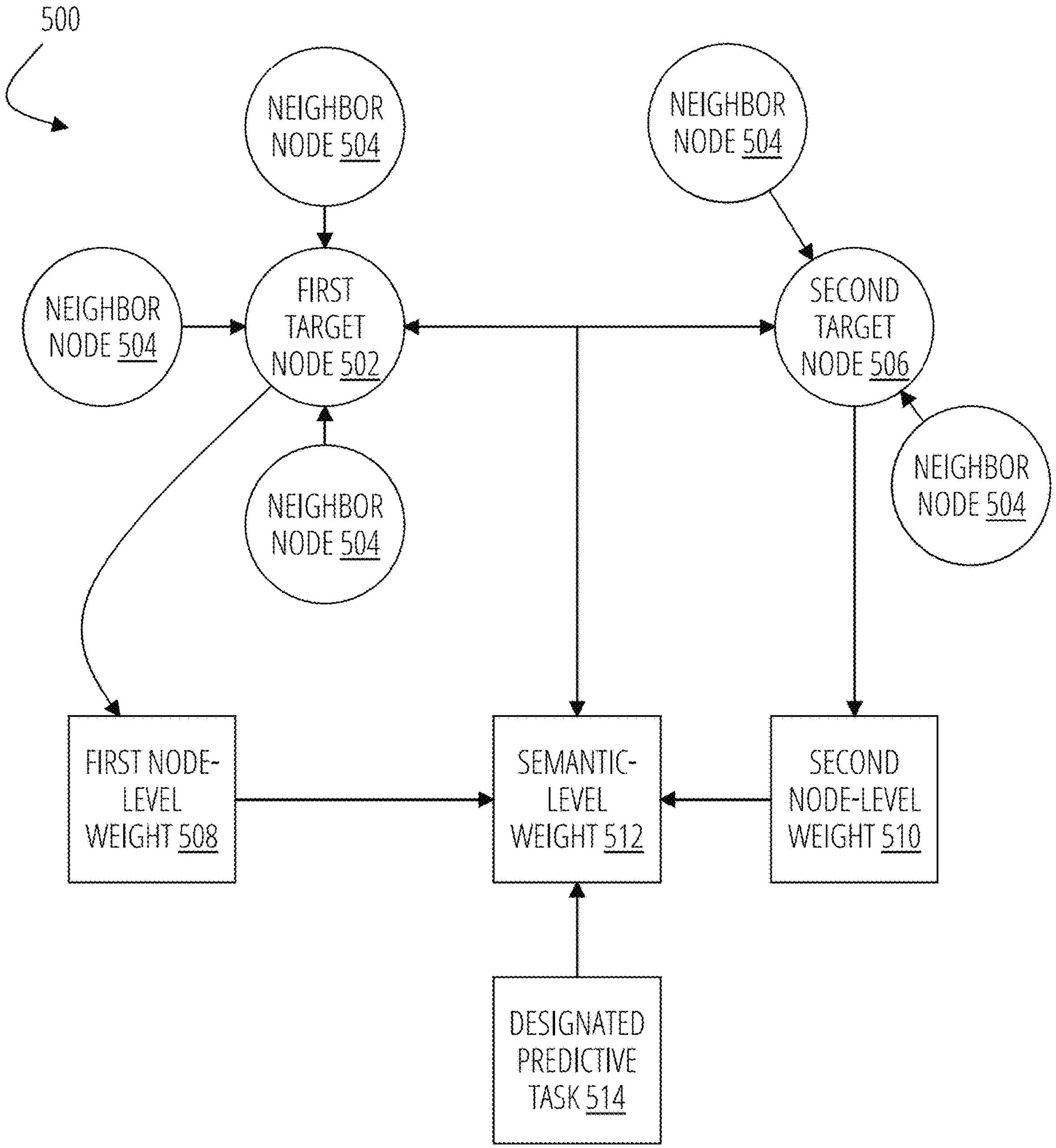
FIG. 5 is an example diagram of an embedding process in accordance with some embodiments discussed herein.

FIG. 5 is an example diagram 500 of an embedding process in accordance with some embodiments discussed herein. The diagram 500 depicts a portion of global graph that include a first target node 502, a second target node 506, and a plurality of neighbor nodes 504 each corresponding to at least one of the first target node 502 or neighbor node 504. Each of the neighbor nodes 504 may include a graph node that is part of meta-path including a respective target node. As depicted, the second target node 506 and the first target node 502 may be neighbors.

The embedding process may include generating node-level weight for each of the target nodes. For instance, a first node-level weight 508 may be generated for the first target node 502 based on one or more node attributes corresponding to the first target node 502 and/or one or more corresponding neighbor nodes 504. In addition, or alternatively, second node-level weight 510 may be generated for the second target node 506 based on one or more node attributes corresponding to the second target node 506 and/or one or more corresponding neighbor nodes 504. The embedding process may include generating a semantic-level weight 512 for a meta-path (and/or one or more weighted edges thereof) based on the node-level weights, the node attributes, and/or edge attributes corresponding to the meta-path. In some examples, the semantic-level weight 512 may be learned based on a designated predictive task 514. In this manner, as described herein, the node-level weights and the semantic-level weights of the global graph may be aggregated to generate graph node embeddings that are tailored to a particular designated predictive task to enable improved prediction processes. An example prediction process will now further be described with reference to FIG. 6.

Figure 6:
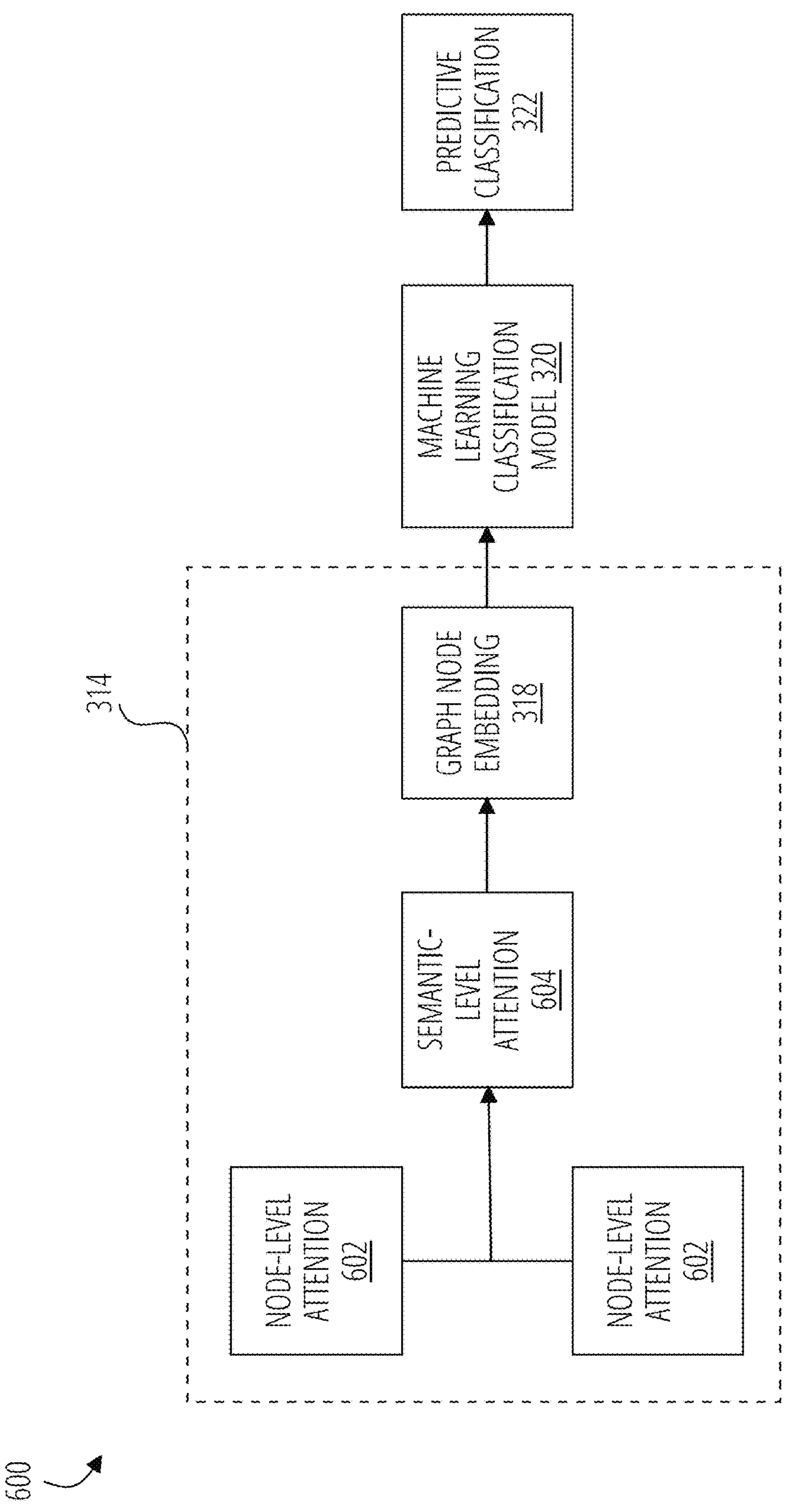
FIG. 6 is an example diagram of a prediction process in accordance with some embodiments discussed herein.

FIG. 6 is an example diagram 600 of a prediction process in accordance with some embodiments discussed herein. The diagram 600 depicts a multi-stage and graph-based prediction technique. In a first stage, a node-level attention 602 may be performed, by the graph-based machine learning model 314, to generate a plurality of node-level weights for the graph nodes of a global graph. In a second stage, a semantic-level attention 604 may be performed, by the graph-based machine learning model 314, to generate a plurality of semantic-level weights for the meta-paths of the global graph. In a third stage, the node-level attention 602, semantic-level attention 604, and graph node attributes may be aggregated to generate a graph node embedding 318 for one or more of the graph nodes of the global graph. In some embodiments, the graph node embedding 318 is leveraged by one or more designated predictive tasks to generate a predictive classification 322. For instance, one or more of the graph node embeddings 318 may be processed by a machine learning classification model 320 to generate one or more predictive classifications 322 for entities within a prediction domain.

Figure 7:
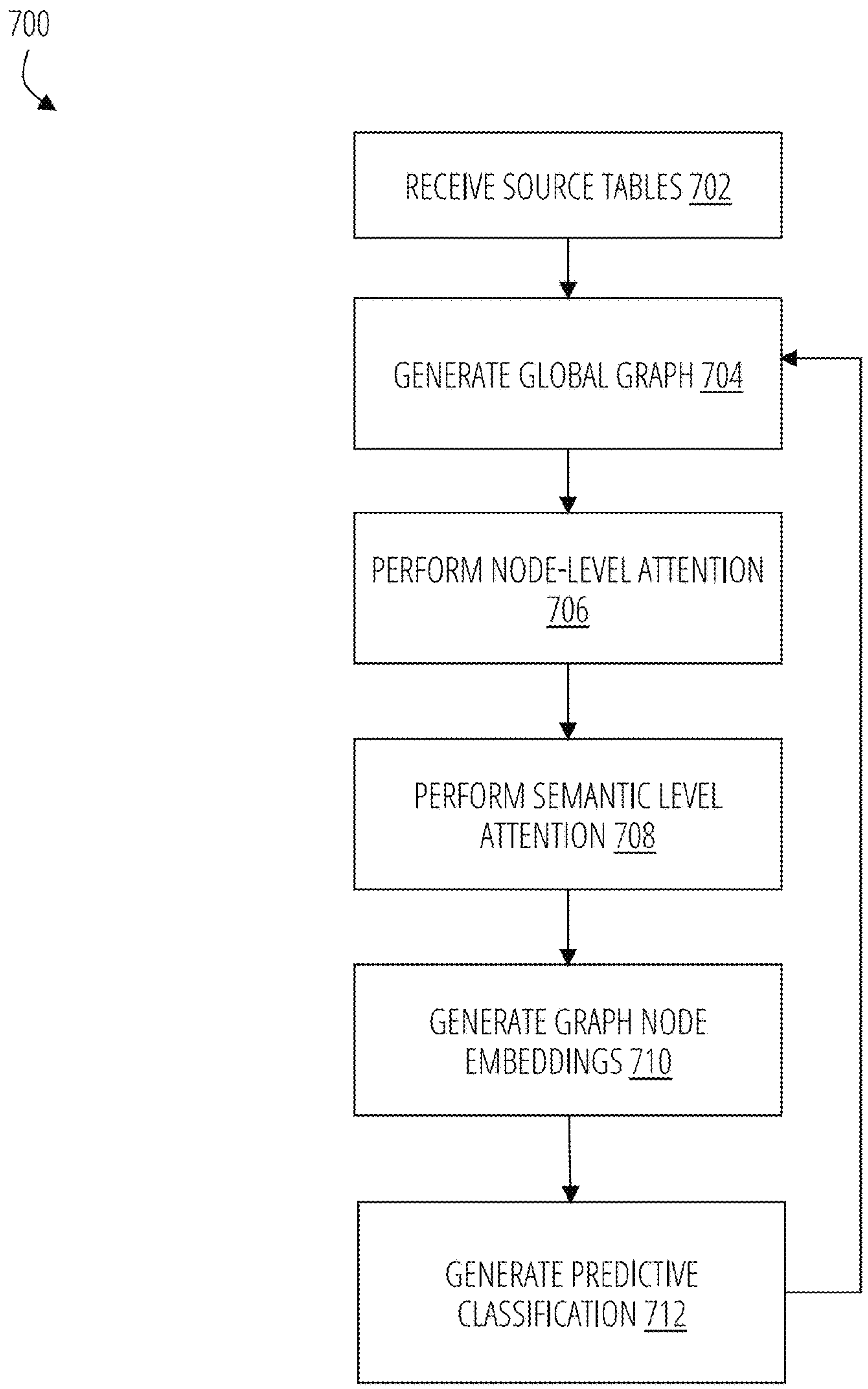
FIG. 7 is a flowchart showing an example data storage and prediction process for processing large data prediction domains in accordance with some embodiments discussed herein.

FIG. 7 is a flowchart showing an example data storage and prediction process 700 for processing large data prediction domains in accordance with some embodiments discussed herein. The flowchart depicts a prediction process 700 for improving the storage and interpretation of complex relationships within a large data prediction domain. The process 700 may be implemented by one or more computing devices, entities, and/or systems described herein. For example, via the various steps/operations of the process 700, the computing system 100 may leverage improved data modeling and prediction techniques to generate a comprehensive global graph tailored to a prediction domain. By doing so, the process 700 enables a flexible prediction process in which relationships may be intelligently encoded with respect to any designated predictive task, thereby improving predictive accuracy for a variety of predictions within the prediction domain. This allows for the reconfiguration and augmentation of robust datasets to dynamically account for changes within a prediction domain.

FIG. 7 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

In some embodiments, the process 700 includes, at step/operation 702, receiving source tables. For example, a computing system 100 may receive a plurality of source tables for a prediction domain.

In some embodiments, the process 700 includes, at step/operation 704, generating a global graph. For example, the computing system 100 may generate, using a plurality of source tables for a prediction domain, a global graph for the prediction domain that includes a plurality of graph nodes and a plurality of weighted edges between the plurality of graph nodes. In some examples, the global graph may include a heterogeneous and/or undirected graph data structure. In some examples, the computing system 100 may generate one or more initial weights for the plurality of weighted edges based on a relationship weighting ruleset.

In some embodiments, the process 700 includes, at step/operation 706, performing node-level attention. For example, the computing system 100 may generate, using a graph-based machine learning model, a plurality of node-level weights for the plurality of graph nodes based on a plurality of node attributes corresponding to the plurality of graph nodes. For instance, a graph node of the plurality of graph nodes may include one or more node attributes of the plurality of node attributes and a node-level weight of the plurality of node-level weights may be generated for the graph node based on the one or more node attributes.

In some embodiments, the process 700 includes, at step/operation 708, performing semantic-level attention. For example, the computing system 100 may generate, using the graph-based machine learning model, a plurality of semantic-level weights for the plurality of weighted edges based on a designated predictive task for the global graph. In some examples, the plurality of node attributes may include one or more node labels for the designated predictive task.

In some embodiments, the process 700 includes, at step/operation 710, generating graph node embeddings. For example, the computing system 100 may generate a plurality of graph node embeddings based on the plurality of node-level weights and the plurality of semantic-level weights.

In some embodiments, the computing system 100 generates, using a semi-supervised loss function, a model loss for the graph-based machine learning model based on the plurality of graph node embeddings. The computing system 100 may update one or more of the plurality of node-level weights and/or the plurality of semantic-level weights based on the model loss.

In some embodiments, the process 700 includes, at step/operation 712, generating predictive classifications. For example, the computing system 100 may initiate the performance of the designated predictive task based on the plurality of graph node embeddings. For instance, the designated predictive task may be a machine learning classification task and initiating the performance of the designated predictive task based on the plurality of graph node embeddings may include generating, using a machine learning classification model, the one or more predictive classifications for one or more unlabeled graph nodes of the plurality of graph nodes.

In some examples, the machine learning classification model includes a clustering model configured to generate one or more node clusters from the plurality of graph nodes based on the plurality of graph node embeddings. In such a case, the one or more predictive classifications may be based on the one or more node clusters.

In some examples, the machine learning classification model includes an embedding-based classification model configured to generate the one or more predictive classifications based on a comparison between a labeled graph node embedding of the plurality of graph node embeddings and an unlabeled graph node embedding of the plurality of graph node embeddings. The labeled graph node embedding may correspond to a labeled graph node of the plurality of graph nodes and the unlabeled graph node embedding may correspond to an unlabeled graph node of the one or more unlabeled graph nodes.

In some embodiments, the computing system 100 modifies a graph node of the plurality of graph nodes by assigning a predictive classification of the one or more predictive classifications to the graph node.

In some embodiments, the computing system 100 receives one or more modification data objects associated with one or more of the plurality of source tables. In response to the one or more modification data objects, the computing system 100 may regenerate the global graph for the prediction domain. In some examples, the one or more modification data objects may be received at a defined time interval.

Some techniques of the present disclosure enable the generation of action outputs that may be performed to initiate one or more prediction-based actions to achieve real-world effects. The computer data storage and interpretation techniques of the present disclosure may be used, applied, and/or otherwise leveraged to generate predictive insights, such as predictive classifications, which may help in the interpretation of diverse relationships within a large data prediction domain. The predictive insights of the present disclosure may be leveraged to initiate the performance of various computing tasks that improve the performance of a computing system (e.g., a computer itself, etc.) with respect to various prediction-based actions performed by the computing system 100, such as for the identification and handling of various predictive classifications and/or the like. Example prediction-based actions may include the display, transmission, and/or the like of data indicative (e.g., including a prediction identifier, etc.) of predictive classification, such as alerts of a COB outcome for a member, and/or the like.

In some examples, the computing tasks may include prediction-based actions that may be based on a prediction domain. A prediction domain may include any environment in which computing systems may be applied to achieve real-word insights, such as risk predictions (e.g., adverse outcome predictions, etc.), and initiate the performance of computing tasks, such as prediction-based actions to act on the real-world insights (e.g., derived from adverse outcome predictions, etc.). These prediction-based actions may cause real-world changes, for example, by controlling a hardware component, providing alerts, interactive actions, and/or the like. For instance, prediction-based actions may include the initiation of automated instructions across and between devices, automated notifications, automated scheduling operations, automated precautionary actions, automated security actions, automated data processing actions, and/or the like.

VI. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. Examples

Example 1. A computer-implemented method, the computer-implemented method comprising generating, by one or more processors and using a plurality of source tables for a prediction domain, a global graph for the prediction domain that comprises a plurality of graph nodes and a plurality of weighted edges between the plurality of graph nodes; generating, by the one or more processors and using a graph-based machine learning model, a plurality of node-level weights for the plurality of graph nodes based on a plurality of node attributes corresponding to the plurality of graph nodes; generating, by the one or more processors and using the graph-based machine learning model, a plurality of semantic-level weights for the plurality of weighted edges based on a designated predictive task for the global graph; generating, by the one or more processors, a plurality of graph node embeddings based on the plurality of node-level weights and the plurality of semantic-level weights; and initiating, by the one or more processors, the performance of the designated predictive task based on the plurality of graph node embeddings.

Example 2. The computer-implemented method of claim 1, wherein the plurality of node attributes comprises one or more node labels for the designated predictive task.

Example 3. The computer-implemented method of claim 2, further comprises generating, using a semi-supervised loss function, a model loss for the graph-based machine learning model based on the plurality of graph node embeddings; and updating one or more of the plurality of node-level weights or the plurality of semantic-level weights based on the model loss.

Example 4. The computer-implemented method of claims 2 or 3, wherein the designated predictive task is a machine learning classification task and initiating the performance of the designated predictive task based on the plurality of graph node embeddings comprises generating, using a machine learning classification model, one or more predictive classifications for one or more unlabeled graph nodes of the plurality of graph nodes.

Example 5. The computer-implemented method of claim 4, further comprising modifying a graph node of the plurality of graph nodes by assigning a predictive classification of the one or more predictive classifications to the graph node.

Example 6. The computer-implemented method of claims 4 or 5, wherein the machine learning classification model comprises a clustering model configured to generate one or more node clusters from the plurality of graph nodes based on the plurality of graph node embeddings and the one or more predictive classifications are based on the one or more node clusters.

Example 7. The computer-implemented method of any of claims 4 through 6, wherein the machine learning classification model comprises an embedding-based classification model configured to generate the one or more predictive classifications based on a comparison between a labeled graph node embedding of the plurality of graph node embeddings and an unlabeled graph node embedding of the plurality of graph node embeddings.

Example 8. The computer-implemented method of claim 7, wherein the labeled graph node embedding corresponds to a labeled graph node of the plurality of graph nodes and the unlabeled graph node embedding corresponds to an unlabeled graph node of the one or more unlabeled graph nodes.

Example 9. The computer-implemented method of any of the preceding claims, wherein generating the global graph comprises generating one or more initial weights for the plurality of weighted edges based on a relationship weighting ruleset.

Example 10. The computer-implemented method of any of the preceding claims, wherein the global graph comprises a heterogeneous and undirected graph data structure.

Example 11. The computer-implemented method of any of the preceding claims, wherein a graph node of the plurality of graph nodes comprises one or more node attributes of the plurality of node attributes and a node-level weight of the plurality of node-level weights is generated for the graph node based on the one or more node attributes.

Example 12. The computer-implemented method of any of the preceding claims, further comprising receiving one or more modification data objects associated with one or more of the plurality of source tables; and in response to the one or more modification data objects, regenerating the global graph for the prediction domain.

Example 13. The computer-implemented method of claim 12, wherein the one or more modification data objects are received at a defined time interval.

Example 14. A computing system comprising memory and one or more processors communicatively coupled to the memory, the one or more processors configured to generate, using a plurality of source tables for a prediction domain, a global graph for the prediction domain that comprises a plurality of graph nodes and a plurality of weighted edges between the plurality of graph nodes; generate, using a graph-based machine learning model, a plurality of node-level weights for the plurality of graph nodes based on a plurality of node attributes corresponding to the plurality of graph nodes; generate, using the graph-based machine learning model, a plurality of semantic-level weights for the plurality of weighted edges based on a designated predictive task for the global graph; generate a plurality of graph node embeddings based on the plurality of node-level weights and the plurality of semantic-level weights; and initiate the performance of the designated predictive task based on the plurality of graph node embeddings.

Example 15. The computing system of claim 14, wherein the plurality of node attributes comprises one or more node labels for the designated predictive task.

Example 16. The computing system of claim 15, wherein the one or more processors are further configured to generate, using a semi-supervised loss function, a model loss for the graph-based machine learning model based on the plurality of graph node embeddings; and update one or more of the plurality of node-level weights or the plurality of semantic-level weights based on the model loss.

Example 17. The computing system of claims 15 or 16, wherein the designated predictive task is a machine learning classification task and initiating the performance of the designated predictive task based on the plurality of graph node embeddings comprises generating, using a machine learning classification model, one or more predictive classifications for one or more unlabeled graph nodes of the plurality of graph nodes.

Example 18. The computing system of claim 17, wherein the one or more processors are further configured to modify a graph node of the plurality of graph nodes by assigning a predictive classification of the one or more predictive classifications to the graph node.

Example 19. One or more non-transitory computer-readable storage media including instructions that, when executed by one or more processors, cause the one or more processors to: generate, using a plurality of source tables for a prediction domain, a global graph for the prediction domain that comprises a plurality of graph nodes and a plurality of weighted edges between the plurality of graph nodes; generate, using a graph-based machine learning model, a plurality of node-level weights for the plurality of graph nodes based on a plurality of node attributes corresponding to the plurality of graph nodes; generate, using the graph-based machine learning model, a plurality of semantic-level weights for the plurality of weighted edges based on a designated predictive task for the global graph; generate a plurality of graph node embeddings based on the plurality of node-level weights and the plurality of semantic-level weights; and initiate the performance of the designated predictive task based on the plurality of graph node embeddings.

Example 20. The one or more non-transitory computer-readable storage media of claim 19, wherein the instructions further cause the one or more processors to receive one or more modification data objects associated with one or more of the plurality of source tables; and in response to the one or more modification data objects, regenerate the global graph for the prediction domain.

What is claimed is:

1. A computer-implemented method comprising:

receiving, by one or more processors, at least a portion of a global graph for a prediction domain that comprises a plurality of graph nodes and a plurality of weighted edges, and a weighted edge of the plurality of weighted edges connects at least two of the plurality of graph nodes;

generating, by the one or more processors and using a graph-based machine learning model, a plurality of node-level weights for the plurality of graph nodes, wherein a node-level weight of the plurality of node-level weights is based on a plurality of node attributes comprising at least a node label associated with a designated predictive task for the global graph;

generating, by the one or more processors, a plurality of graph node embeddings based on the plurality of node-level weights; and initiating, by the one or more processors, a performance of the designated predictive task based on the plurality of graph node embeddings.

2. The computer-implemented method of claim 1, further comprising:

generating, using the graph-based machine learning model, a semantic-level weight for the weighted edge based on the designated predictive task; and generating the plurality of graph node embeddings based on the plurality of node-level weights and the semantic-level weight.

3. The computer-implemented method of claim 1, wherein the node label comprises a ground truth label value for the designated predictive task.

4. The computer-implemented method of claim 1, wherein the node-level weight is a learned attention value for a graph node that is based on one or more of the plurality of node attributes and one or more meta-path-based neighbors associated with the graph node.

5. The computer-implemented method of claim 4, wherein the node-level weight is updated, during training of the graph-based machine learning model, based on a model loss for the graph-based machine learning model that is determined based on the node label.

6. The computer-implemented method of claim 5, further comprising, during training of the graph-based machine learning model:

generating, using a semi-supervised loss function, the model loss for the graph-based machine learning model based on the plurality of graph node embeddings; and updating the node-level weight of the graph node or a semantic-level weight of the weighted edge based on the model loss.

7. The computer-implemented method of claim 1, wherein the designated predictive task is a machine learning classification task and initiating the performance of the designated predictive task based on the plurality of graph node embeddings comprises:

generating, using a machine learning classification model, a predictive classification for an unlabeled graph node of the plurality of graph nodes.

8. The computer-implemented method of claim 7, further comprising:

providing the predictive classification for augmenting at least one of the plurality of graph nodes by assigning the predictive classification to the unlabeled graph node of the plurality of graph nodes.

9. The computer-implemented method of claim 7, wherein the machine learning classification model comprises a clustering model configured to generate one or more node clusters from the plurality of graph nodes based on the plurality of graph node embeddings and the predictive classification is based on the one or more node clusters.

10. The computer-implemented method of claim 1, wherein the global graph comprises a heterogeneous and undirected graph data structure.

11. A system comprising:

one or more processors; and one or more memories storing processor-executable instructions that, when executed by the one or more processors, cause the one or more processors to perform operations comprising:

receiving at least a portion of a global graph for a prediction domain that comprises a plurality of graph nodes and a plurality of weighted edges, and a weighted edge of the plurality of weighted edges connects at least two of the plurality of graph nodes;

generating, using a graph-based machine learning model, a plurality of node-level weights for the plurality of graph nodes, wherein a node-level weight of the plurality of node-level weights is based on a plurality of node attributes comprising at least a node label associated with a designated predictive task for the global graph;

generating a plurality of graph node embeddings based on the plurality of node-level weights; and initiating a performance of the designated predictive task based on the plurality of graph node embeddings.

12. The system of claim 11, wherein the operations further comprise:

generating, using the graph-based machine learning model, a semantic-level weight for the weighted edge based on the designated predictive task; and generating the plurality of graph node embeddings based on the plurality of node-level weights and the semantic-level weight.

13. The system of claim 11, wherein the node label comprises a ground truth label value for the designated predictive task.

14. The system of claim 11, wherein the node-level weight is a learned attention value for a graph node that is based on one or more of the plurality of node attributes and one or more meta-path-based neighbors associated with the graph node.

15. The system of claim 14, wherein the node-level weight is updated, during training of the graph-based machine learning model, based on a model loss for the graph-based machine learning model that is determined based on the node label.

16. The system of claim 15, wherein the operations further comprise, during training of the graph-based machine learning model:

generating, using a semi-supervised loss function, the model loss for the graph-based machine learning model based on the plurality of graph node embeddings; and updating the node-level weight of the graph node or a semantic-level weight of the weighted edge based on the model loss.

17. One or more non-transitory computer-readable media storing processor-executable instructions that, when executed by one or more processors, cause the one or more processors to perform operations comprising:

receiving at least a portion of a global graph for a prediction domain that comprises a plurality of graph nodes and a plurality of weighted edges, and a weighted edge of the plurality of weighted edges connects at least two of the plurality of graph nodes;

generating, using a graph-based machine learning model, a plurality of node-level weights for the plurality of graph nodes, wherein a node-level weight of the plurality of node-level weights is based on a plurality of node attributes comprising at least a node label associated with a designated predictive task for the global graph;

generating a plurality of graph node embeddings based on the plurality of node-level weights; and initiating a performance of the designated predictive task based on the plurality of graph node embeddings.

18. The one or more non-transitory computer-readable media of claim 17, wherein the designated predictive task is a machine learning classification task and initiating the performance of the designated predictive task based on the plurality of graph node embeddings comprises:

generating, using a machine learning classification model, a predictive classification for an unlabeled graph node of the plurality of graph nodes.

19. The one or more non-transitory computer-readable media of claim 18, wherein the operations further comprise:

providing the predictive classification for augmenting at least one of the plurality of graph nodes by assigning the predictive classification to the unlabeled graph node of the plurality of graph nodes.

20. The one or more non-transitory computer-readable media of claim 19, wherein the machine learning classification model comprises a clustering model configured to generate one or more node clusters from the plurality of graph nodes based on the plurality of graph node embeddings and the predictive classification is based on the one or more node clusters.

* * * * *